United States Patent [19]
Forest et al.

[11] Patent Number: 6,098,043
[45] Date of Patent: Aug. 1, 2000

[54] METHOD AND APPARATUS FOR PROVIDING AN IMPROVED USER INTERFACE IN SPEECH RECOGNITION SYSTEMS

[75] Inventors: Serge Forest, Laval; Pierre M. Forgues, Greenfield Park; Brian Cruickshank, Oakville, all of Canada

[73] Assignee: Nortel Networks Corporation, Montreal, Canada

[21] Appl. No.: 09/107,386

[22] Filed: Jun. 30, 1998

[51] Int. Cl.[7] .................................................. G10L 15/00
[52] U.S. Cl. ............................ 704/270; 704/251; 379/88
[58] Field of Search ................................... 704/270, 233, 704/251; 379/88

[56] References Cited

U.S. PATENT DOCUMENTS

| | | | |
|---|---|---|---|
| 4,914,692 | 4/1990 | Hartwell et al. | 379/410 |
| 5,594,784 | 1/1997 | Velius | 379/88 |
| 5,765,130 | 6/1998 | Nguyen | 704/233 |

OTHER PUBLICATIONS

Enterprise Computer Telephony Forum S.100 Revision 1.0 Media Services "C"Language Application Programming Interfaces, World Wide Web at http://www.ectf.org, 1996, pp. 301–.

Primary Examiner—David R. Hudspeth
Assistant Examiner—Susan Wieland

[57] ABSTRACT

The invention relates to a method and an apparatus for improving the responsiveness and accuracy of speech recognition systems with tightly integrated Automatic Speech Recognition (ASR) and voice resources, more particularly to a system and method for providing an improved speech recognition enhanced user interface through a reduction in the effective talk-over period. The speech recognition system comprises a host server, managing and arbitrating between a voice resource and an ASR resource, among other resources, through the exchange of run-time controls. The novel method provides for a daisy chain architecture within the speech recognition system, whereby the voice data, or prompt, output by the voice resource is passed directly to the ASR resource, where it is output to the system user. Upon detection of speech from the user, the ASR resource stops transmitting the prompt to the system user, transparent to both the voice resource and the server, followed by a "speech detected" message sent to the server. The delay between the time at which the speech is detected and the time at which the voice resource stops playing the prompt, as a result of a "stop play" request received from the server, goes unnoticed by the system user due to the ASR resource intervention.

8 Claims, 5 Drawing Sheets

METHOD AND APPARATUS FOR PROVIDING AN IMPROVED USER INTERFACE IN SPEECH RECOGNITION SYSTEMS

FIELD OF THE INVENTION

This invention relates to the field of systems with speech recognition enabled services using prompts to inform the user and request information from the user. It is particularly applicable to Computer Telephony (CT) and may be used to provide voice-activated dialing, credit stock information and other speech recognition enabled services.

BACKGROUND OF THE INVENTION

In addition to providing printed telephone directories, many companies also provide a variety of information services to their telephone network subscribers and users. These services may include stock quotes, directory assistance and many others. In most of these applications, when the information requested can be expressed as a number or number sequence, the user is required to enter a request via a touch tone telephone. This is often aggravating for the user since he is usually obliged to make repetitive entries in order to obtain a single answer. This situation becomes even more difficult when the input information is a word or phrase. In such situations, the involvement of a human operator may be required to complete the desired task.

Because companies are likely to handle a very large number of calls per year, the associated labor costs become very significant. Consequently, such companies, along with telephone equipment manufacturers, have devoted considerable efforts to the development of systems that reduce the labor costs associated with providing information services on the telephone network. These efforts comprise the development of sophisticated systems that can be used in the context of telephone networks. Of particular interest, the field of Computer Telephony (CT) provides applications with value-added functionality to telephone users.

In order to provide a wide range of services to the telephone users, a high level of integration between a variety of different technologies is required. Typically, the integration of technologies such as interactive voice response, fax, telephone network access, telephone network features, interface to the internet and others is key to obtaining a successful application. A specific area of interest is the co-existence of voice resources, providing play/record and tone detection/generation functionality, and automatic speech recognition (ASR) resources, for applications using speech recognition as the main user interface over the telephone network.

In typical Computer Telephony (CT) systems, the application software interacts with the different types of resources through a multi-media server. Commonly, the multi-media server manages and arbitrates between different types of resources that provide specialized services. In a specific example, these services include automatic speech recognition, fax, voice interface and others, where each service-providing resource is commonly decoupled from all of the other resources. In the CT field, a number of specifications have been adopted in order to regulate the operations between the application program and the server, for example the Enterprise Computer Telephony Forum (ECTF) S.100 software specification (1996). A number of specifications have also been adopted in order to regulate the operations between the server and the resources, such as the ECTF S.300 software specification (1996).

A typical computer telephony (CT) platform comprises an application, a CT server, a voice resource and an automated speech recognition (ASR) resource. In a typical interaction, the CT server or the application sends a "play request" to the voice resource. The voice resource receives the request and plays the appropriate message. Once the message is complete, the voice resource sends a "play complete" message to the CT server. The CT server, upon reception of the "play complete" message, sends a start recognition request to the ASR resource. The ASR resource, upon receipt of the start recognition request, initiates the recognition process and, upon completion, sends a "recognition done" message to the CT server. The CT server then completes the process by requesting the recognition results from the ASR resource.

A problem with systems of the type described above is that if a user responds to the prompt before the latter is complete, the system does not detect the user's response. This may be inconvenient for a frequent user of the service who does not need to hear the end of the prompt before providing an answer.

A known solution to this problem is to create a system that allows premature responses to a prompt, herein designated as barge-in responses. In this case, the CT server sends a recognition request to the ASR resource before the play request is sent to the voice resource. The ASR resource is therefore ready to receive a spoken utterance before the voice resource has started playing the prompt. In a typical interaction, the CT server or the application sends a "start recognition" request to the ASR resource. The ASR resource, upon receipt of the "start recognition" request, initiates the recognition process and attempts to detect speech. The CT server then sends a "play" request to the voice resource. The voice resource receives the request and plays the appropriate message. When the ASR detects speech, it sends a "speech detected" message to the CT server or the application. If speech is detected before the voice resource has finished playing the prompt, the server sends a "stop playing" request to the voice resource which terminates the playing of the prompt. The ASR resource, upon detection of the speech, initiates the recognition process and, upon completion, sends a "recognition done" message to the CT server. The CT server/application then completes the process by requesting the recognition result from the ASR resource. If the voice resource finishes playing the prompt before the speech is detected, then the "stop playing" request of the CT server is either not sent or has no effect on the voice resource.

In order to implement speech recognition systems which support barge-in responses, it is crucial that the ASR resource be capable of providing line Echo Cancellation (EC). This feature allows the ASR resource to cancel out the echo of the prompt from the incoming signal, where this prompt is being played by the voice resource on the external line. This prompt echo exists at the CT system receiving end when the system provides externally accessible services to analog devices, for instance analog telephones, and can cause important degradation to the system's speech recognition accuracy. Therefore, a system which provides Echo Cancellation can detect the user's speech even in the presence of relatively strong line echo, necessary for the barge-in response feature where the user can interrupt the system's voice resource prompts at any time.

A problem with systems of the type described above is that between the time the speech is detected and the time at which the voice resource receives the stop playing message, the user must talk simultaneously with the prompt, a situation herein referred to as talk-over. Furthermore, if the server and application are operating under a heavy load and are managing multiple calls simultaneously, this talk-over period may be quite long in duration. If the talk-over period is too long, it may degrade the performance of the recognizer and cause annoyance to the user.

Thus, there exists a need in the industry to refine the user prompting process adopted by systems with speech recognition enabled services, so as to obtain an improved speech recognition user interface.

OBJECTS AND STATEMENT OF THE INVENTION

An object of this invention is to eliminate the talk-over period so as to improve the system user interface and thus increase the responsiveness and accuracy of the system.

This invention provides an automated speech recognition system which comprises voice resource means for generating a voice prompt signal that is representative of a voice prompt which informs a user, as well as automated speech recognition means for recognizing the vocal response of the user. The automated speech recognition system also includes server means for controlling the operation of both the voice resource means and the automated speech recognition means, as well as outside loop means having a receiving end and a transmitting end, for communication with the user. The automated speech recognition means, receiving as inputs the vocal response, via the receiving end of the outside loop means, and the voice prompt signal, are adapted for passing to the transmitting end of the outside loop the voice prompt signal. The automated speech recognition means are also adapted for selectively terminating the passage of the voice prompt signal to the transmitting end immediately upon detecting an echo canceled spoken utterance via the receiving end of the outside loop.

The invention also provides an automated speech recognition resource which offers speech recognition services to a server. The automated speech recognition resource comprises a first input to receive a first signal representative of a voice prompt to be communicated to a user, a second input to receive a second signal representative of audio data expressed when uttering a certain word and an output to release the first signal. The automated speech recognition resource also includes processing means coupled to the second input, for terminating the release of the first signal through the output in response to the detection of the second signal at the second input, when the second signal is other than the echo of the first signal, and for performing speech recognition of the second signal and outputting a data element in accordance with a result of the speech recognition, the data element being suitable for processing by the server. In an embodiment of this invention, the processing means include an echo canceler for reducing a magnitude of an echo signal of the first signal.

The invention further provides a speech recognition system for processing voice data which includes an outside loop, comprising a receiving end and a transmitting end, and a first and second signal, where the first signal is received as input to the system from a system user at the receiving end and the second signal is transmitted as output from the system to the system user over the transmitting end. The speech recognition system also includes a plurality of resources for performing specialized tasks, in particular a voice resource for generating the second signal and an Automatic Speech Recognition (ASR) resource which receives as inputs the first and second signals and which outputs the second signal from the speech recognition system. The speech recognition system further includes a voice bus for interconnecting the plurality of resources and a host server for managing and arbitrating between the plurality of resources.

In a preferred embodiment of this invention, the speech recognition system defined above is used in computer telephony applications to provide information services to a wide range of system users, for instance providing directory assistance to the subscribers of a telephone network. Such a speech recognition system is typically comprised of an Automatic Speech Recognition (ASR) resource and a voice resource, typically implemented on specialized processors such as Digital Signal Processors (DSPs), as well as a host server for managing and arbitrating between the two resources, typically running on a multipurpose processor.

The ASR resource provides for both an Echo Cancellation and a speech recognition functionality. The Echo Cancellation process is one where the echo of the voice data, or prompt, being played on the external line is canceled from the incoming signal which constitutes the user's speech. This is a critical feature in speech recognition systems with barge-in response capability, where the user can interrupt the system's prompts at any time. The speech recognition module of the ASR resource is responsible for detecting and recognizing speech arriving from the user over the external line, a task made much more difficult by the existence of a residual echo in the signal.

In order to achieve communication between the various units of a computer telephony network as well as the users, hence providing a variety of services, CT systems require various types of control signals. These signals include tones which are used to convey information to the system from the user or, alternatively, to inform the user of the current status of a telephone transaction. Tones may also be used to communicate between switches and other parts of the CT network itself. The voice resource is responsible for detecting the tones arriving from the user over the external line, as well as for generating the voice data, or prompt, to be sent over the outside loop to the system user. Alternatively, a separate signal detection resource may be used to detect the tones.

The current inventors have made the novel discovery that by redirecting the flow of voice data (prompt) within the Computer Telephony (CT) system, an important improvement in the accuracy and responsiveness of the CT system arises. The direction of this flow is hereafter referred to as a "daisy chain", whereby the prompt's audio is handed off from the voice resource to the ASR resource to the outside loop, as opposed to being handed off directly from the voice resource to the outside loop. Specifically, the output of the voice resource's Play module feeds directly into the ASR resource, where it is used both as a reference for the echo cancellation (EC) process and to copy to the transmit end of the outside loop for the user to hear. The user's speech, arriving on the receive end of the outside loop, is input to the voice resource, at which point the speech is forwarded to the Tone Detection module for detecting tones, as described above. The user's speech is also input to the ASR resource, where it is fed into the Echo Cancellation (EC) module. The echo cancellation operation effected by the EC module consists in subtracting the reference signal (output of voice resource's Play module) from the incoming signal arriving from the user at the receive end of the outside loop, allowing the ASR resource to extract a clean signal for speech recognition purposes. The ASR resource uses the echo canceled signal to determine when the user actually starts to speak and to perform the recognition task.

As a result of the daisy chain flow of voice data within the CT system, the ASR resource controls what is being output to the user. When speech is detected by the ASR resource's Speech Recognition module, the ASR resource will immediately start ignoring the prompt's audio data, cutting off its output to the transmit end of the outside loop. The effective talk-over period length, specifically the period between the time the user speech is detected and the time the prompt playback is stopped, is therefore dramatically reduced from that which characterizes current speech recognition CT systems, constituting an important improvement to such systems' user interface and speech recognition accuracy.

The above-described method for improving the user interface in speech recognition systems can be implemented on any suitable computing platform, typically comprising a Central Processing Unit (CPU) and a memory, connected by a data control bus. Specific to the current invention, the computing platform also includes the ASR resource and the voice resource, connected via a voice bus. In a preferred embodiment of the current invention, this computing platform consists in a single computer, where various resources may be implemented on one or more computer boards installed on the computer, all interconnected via a voice bus. Alternatively, the computing platform may be spread out across several separate but network-connected computers.

In a preferred embodiment of this invention, both the CT system multi-media server and application run on a single CPU. Alternatively, the application may run from another computer connected to the CT system network. The memory contains a program element that controls the operation of the CT server, comprised of individual instructions that are executed by the CPU, providing the intended system functionality.

A computer board installed on the computer typically includes one or more specialized processors, for instance Digital Signal Processor (DSP) modules, connected by both a voice and data bus, and implementing the system resources. In a preferred embodiment of this invention, both the ASR resource and the voice resource are implemented to run on DSPs located on the same computer board. Alternatively, each resource could be running on DSPs located on different computer boards, both of which would be interconnected via a control data bus and a voice bus. Specific to this invention, the ASR resource DSP module can both receive and send audio data from and to the voice bus connection to the outside loop, while the voice resource DSP module can only receive audio data from the same voice bus. Any audio data to be sent from the voice resource must first pass through the ASR resource DSP module, which then may or may not forward this audio data for transmission to the outside loop, thus forming the daisy chain implementation described above.

The invention provides a method of controlling a voice prompt in an automated speech recognition resource which offers speech recognition services to a server. The automated speech recognition resource comprises a first input to receive a first signal representative of a voice prompt to be communicated to a user, a second input to receive a second signal representative of audio data expressed when uttering a certain word and an output to release the first signal. The method comprises the steps of terminating the release of the first signal through the output in response to the detection of the second signal at the second input, when the second signal is other than the echo of the first signal, and of performing speech recognition of the second signal and outputting a data element in accordance with a result of the speech recognition, the data element being suitable for processing by the server. In an embodiment of the invention, the method comprises the additional step of reducing a magnitude of an echo signal of the first signal.

The invention also provides a method for redirecting the flow of voice data in a speech recognition system which includes an outside loop, comprising a receiving end and a transmitting end, and a first and second signal, where the first signal is received as input to the system from a system user at the receiving end and the second signal is transmitted as output from the system to the system user over the transmitting end. The speech recognition system also includes a plurality of resources for performing specialized tasks, in particular a voice resource for generating the second signal and an Automatic Speech Recognition (ASR) resource which receives as inputs the first and second signals and which outputs the second signal from the speech recognition system. The speech recognition system further includes a voice bus for interconnecting the plurality of resources and a host server for managing and arbitrating between the plurality of resources. The method comprises the step of daisy chaining the voice data from the voice resource through the ASR resource, in order to provide full control to the ASR resource over the output of voice data from the speech recognition system.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Known systems with speech recognition enabled services, of the type described above, rely on passing control messages between the voice resource and the ASR resource at the server level, commonly referred to as run-time controls (RTCs). These control messages are usually exchanged via a control processor or a host processor, between the two (or more) different system resources. One reason that such systems are ineffective is that a delay occurs between the reception of the "speech detected" message from the ASR resource and the execution of the "stop playing" command by the voice resource, both of which messages are exchanged via the control processor. Typically, this delay is due to the fact that the control processor is busy managing the multi-media application for many channels, with the potential for significant latencies to occur within the system.

The present inventors have made the novel discovery that by redirecting the flow of audio data being sent to the system user from the system's voice resource, an important improvement in the responsiveness and accuracy of systems using tightly integrated voice and ASR resources for speech applications can be obtained. Specifically, the improvement can reduce the above described effective talk-over period within such speech recognition systems, by minimizing the impact of a slow response time by the server or application to the RTCs. Note that this improved system responsiveness will remain constant as the system is scaled up to a higher number of multi-media application channels.

Figure 1:
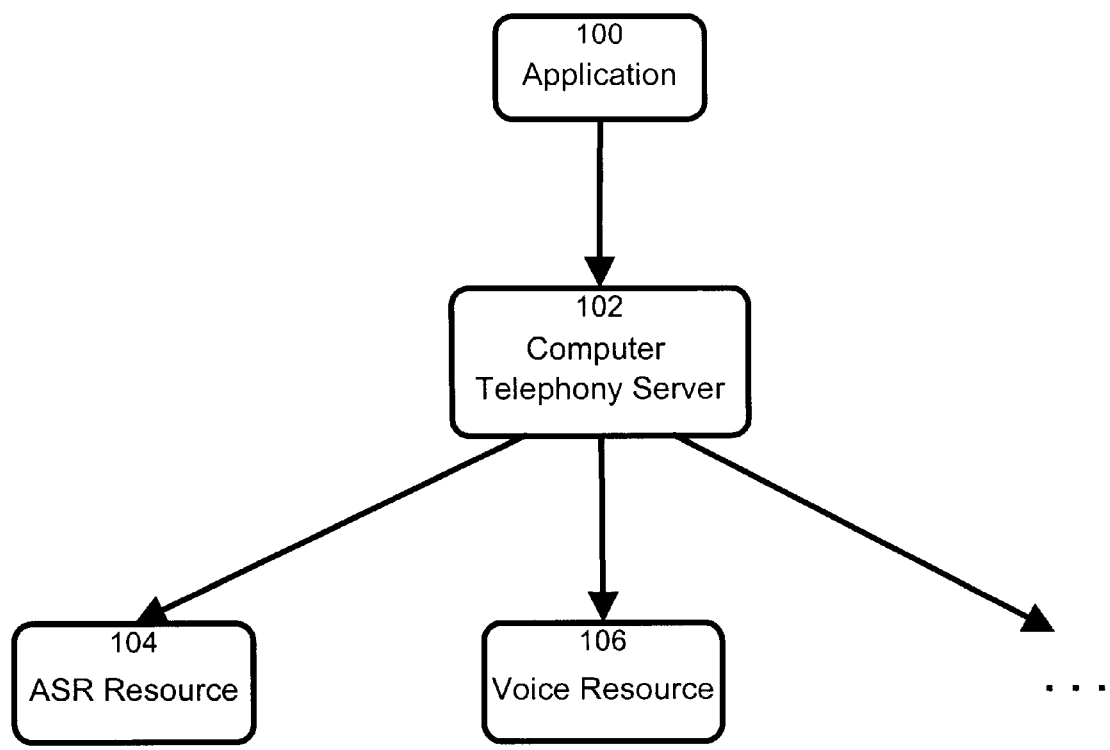
FIG. 1 shows a high level block diagram of the software architecture for a computer telephony system, in accordance with the present invention.

FIG. 1 shows a high level block diagram of a preferred embodiment of the software architecture for a computer telephony (CT) system. The application 100 layer implements a specific service such as a directory assistance system, a flight information service, a stock quoting system or any other speech recognition enabled service. The application communicates with the computer telephony server 102, which typically manages the resource availability and is responsible for allocating resources to each particular application. In a specific example, the CT server 102 manages and communicates with the ASR resource 104 and the voice resource 106. Commonly, these resources are allocated on a per call basis. For example, each time a call is initiated or answered, an instance of the resource is created in order to provide the services during the call. Alternatively the resources are allocated dynamically during specific portions of the call. The resource allocation and management is generally done such that it is transparent to the resources being managed.

In a preferred embodiment of this invention, the resources such as the ASR and the voice interface are implemented on specialized processors such as Digital Signal Processors (DSPs). The multimedia server may run on a multipurpose processor, for example the CPU of a computer. The application may run on the same processor as the server or may run from another computer connected to the network.

Figure 2:
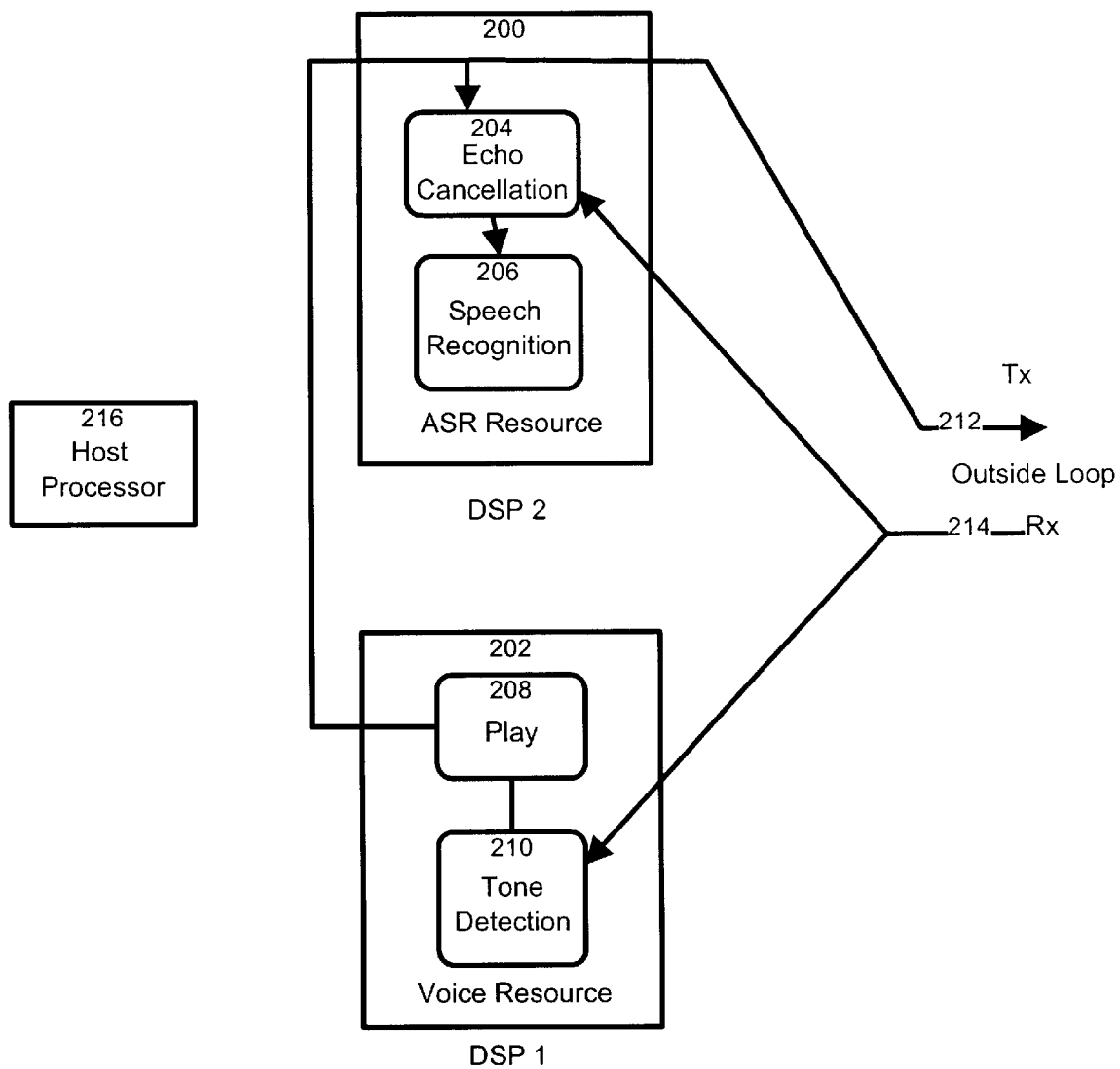
FIG. 2 shows a block diagram of the functional implementation of a computer telephony system, in accordance with the present invention.

FIG. 2 is a block diagram representative of the functional implementation of a computer telephony (CT) system in accordance with a preferred embodiment of this invention, where the CT system comprises an ASR resource 200 and a voice resource 202, both of which are shown running on DSPs, and a Host Processor 216. The ASR resource 200 recognizes the vocal response of the user, while the voice resource 202 generates a voice prompt signal representative of a voice prompt which informs a user. The ASR resource 200 comprises an Echo Cancellation module 204 and a Speech Recognition module 206, while the voice resource 202 comprises, among other things, a Play module 208 and a Tone Detection module 210. In an alternative embodiment of this invention, the Tone Detection module is implemented on a separate signal detection resource.

Within the CT system, the Play module 208 is responsible for playing the user prompt, to be transmitted to the user over an external line. The Echo Cancellation module 204 is responsible for the EC process, whereby the echo of the Play module 208 prompt being played on the external line is canceled from the incoming signal which constitutes the user's speech. This is a critical feature in speech recognition systems with barge-in response capability, where the user can interrupt the system's prompts at any time. The Speech Recognition module 206 itself is responsible for detecting speech arriving from the user over the external line, a task made much more difficult by the existence of a residual echo in the signal. The structure and functionality of these three modules will not be described in more detail as they are well documented and known to those who are skilled in the art.

In order to achieve communication between the various units of a computer telephony network as well as the users, hence providing a variety of services, CT systems require various types of control signals. These signals include tones which are used to convey information to the system from the user or, alternatively, to inform the user of the current status of a telephone transaction. Tones may also be used to communicate between switches and other parts of the CT network itself.

The correct detection of a tone is crucial to the functioning of the CT network, since the latter relies on them for operations such as dialing, billing and coin identification. Users also rely on these tones for information such as a busy signal, dialing and the dial tone. As a concrete example, automatic redial when faced with a billing signal and recognition of an incoming fax would not be possible without accurate tone recognition.

Four categories of signaling are commonly used, each with its own specifications and purposes. They are multi-frequency (MF) tones, dual-tone multi-frequency tones (DTMF), international MF-R2 tones and call progress tones (CPT). There are other signaling sequences that are not mentioned here since their purposes are similar in nature to the four signaling conventions mentioned above.

In a preferred embodiment of the current invention, the DTMF signaling convention is used by the Tone Detection module 210, responsible for detecting tones arriving from the user over the external line. As the DTMF signaling convention is well documented, known to those who are skilled in the art and not critical to the success of this invention, it will not be described in more detail. Alternatively, other types of signaling conventions could also be used in keeping with the spirit of the present invention.

The Host Processor 216 is where resides the CT multi-media server, responsible for communicating with and controlling the operation of both the ASR resource 200 and the voice resource 202 through the exchange of RTCs, to be described in more detail below.

Specific to the present invention, FIG. 2 shows the flow of audio data (prompt) being sent from the CT system's voice resource 202 to the system user over the external line, or outside loop. This outside loop comprises both a receiving end 214 and a transmitting end 212, and allows communication with a system user. The direction of this flow is hereafter referred to as a "daisy chain", whereby the prompt's audio is handed off from the voice resource 202 to the ASR resource 200 to the transmitting end 212 of the outside loop, as opposed to being handed off directly from the voice resource 202 to the transmitting end 212. Specifically, the output of the Play module 208, the voice prompt signal, feeds directly into the ASR resource 200 as a first input, where it is used both as a reference for the echo cancellation (EC) process and to copy to the transmitting end 212 of the outside loop for the user to hear. The user's speech, or vocal response, arriving on the receiving end 214 of the outside loop, is input to the voice resource 202, at which point the speech is forwarded to the Tone Detection module 210 for detecting tones, as described above. The user's speech is a second input to the ASR resource 200, where it is fed into the Echo Cancellation (EC) module 204 for canceling line echo from the signal. The echo cancellation operation effected by the EC module 204 consists in subtracting the reference voice prompt signal (output of play module 208) from the incoming signal arriving from the user at the receiving end 214, thus allowing the ASR resource to reduce the echo signal magnitude distorting the user's speech and extract a clean signal for the Speech Recognition module 206. The ASR resource 200 uses the echo canceled signal to determine when the user actually starts to speak.

As a result of the daisy chain flow of voice data within the CT system, the ASR resource 200 controls what is being output to the user. When speech is detected by the Speech Recognition module 206, the ASR resource will immediately start ignoring the prompt's audio data, terminating its passage to the transmitting end 212 of the outside loop. The effective talk-over period length, specifically the period between the time the user speech is detected and the time the prompt playback is stopped, is therefore dramatically reduced from that which characterizes current speech recognition CT systems, constituting an important improvement to such systems' user interface and speech recognition accuracy.

Figure 3:
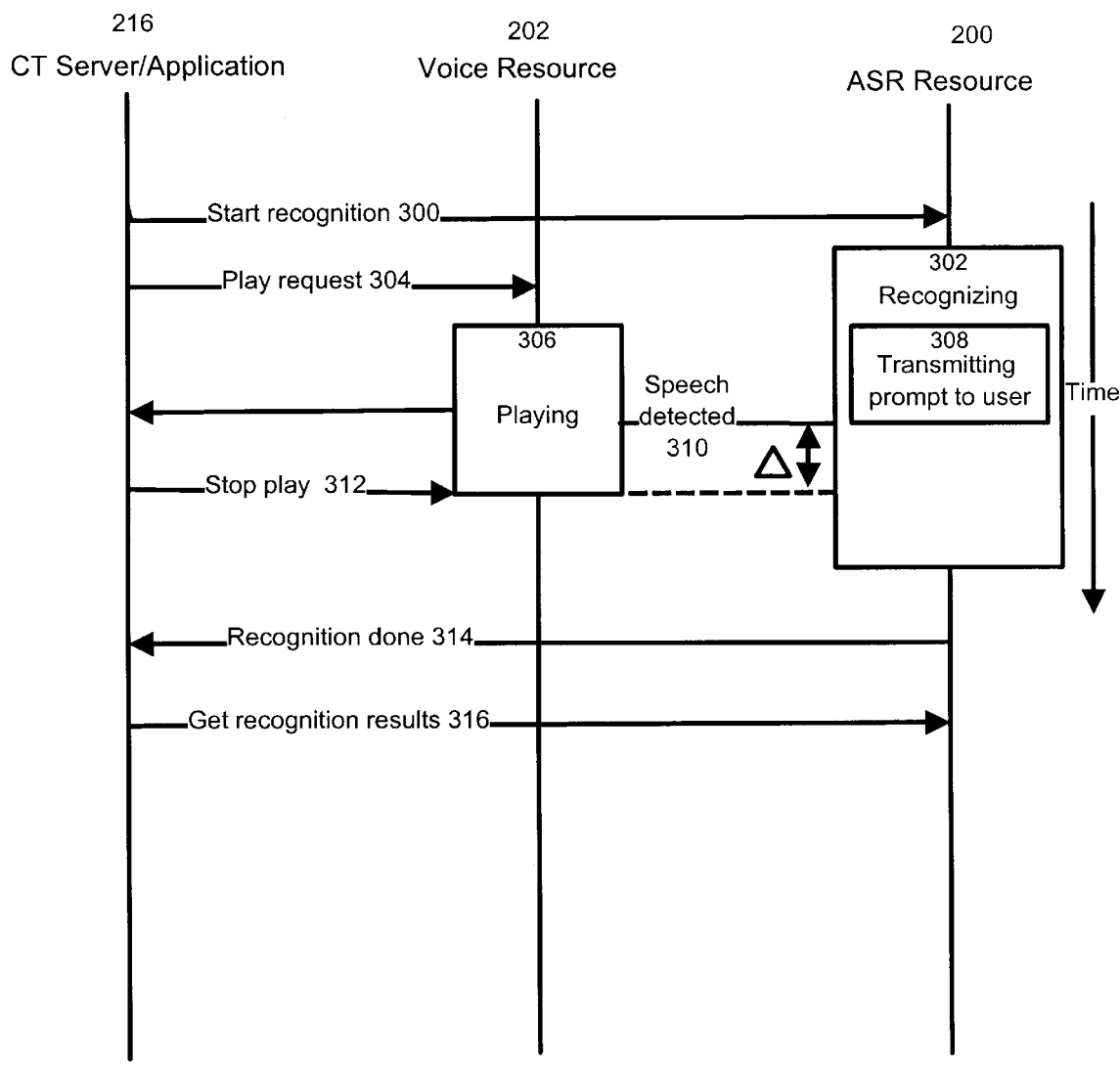
FIG. 3 shows a block diagram of the interaction between the computer telephony server/application and its resources, in accordance with the present invention.

FIG. 3 is a block diagram which depicts the interaction between the CT server/application (running on Host Processor 216) and its resources, for the CT system shown in FIG. 2 and described above. A "start recognition" request 300 is sent by the server/application 216 to the ASR resource 200, putting the ASR resource 200 on alert for any user speech arriving over the outside loop. A "play" request 304 is next sent to the voice resource 202, initializing the playing of the user prompt. The ASR resource 200 receives the prompt audio data from the voice resource 202, and forwards the prompt to the user over the outside loop. Assuming that speech is detected by the ASR resource 200, a "speech detected" message 310 is sent back to the server/application 216, and the ASR resource 200 stops forwarding the prompt over the outside loop to the user. Upon receipt of the "speech detected" message from the ASR resource 200, the server/application 216 stops the prompt playback from the voice resource 202 by sending a "stop play" message 312. The difference Δ shown in FIG. 3 represents the time period during which the prompt has stopped being transmitted over the outside loop to the user, even though the voice resource has not yet received the "stop play" run-time control from the server and therefore is still playing the prompt. The effect of the daisy chain flow of audio data is transparent to the server/application, implying that the server is still responsible for stopping the prompt playback at the source, ignorant of the fact that the ASR resource 200 may intervene to ensure that the prompt is no longer playing out to the user. Once the speech recognition is completed by the ASR resource 200, a "recognition done" message 314 is sent to the server/application 216, which itself then requests the recognition results from the ASR resource 200, thereby completing the process.

Figure 4:
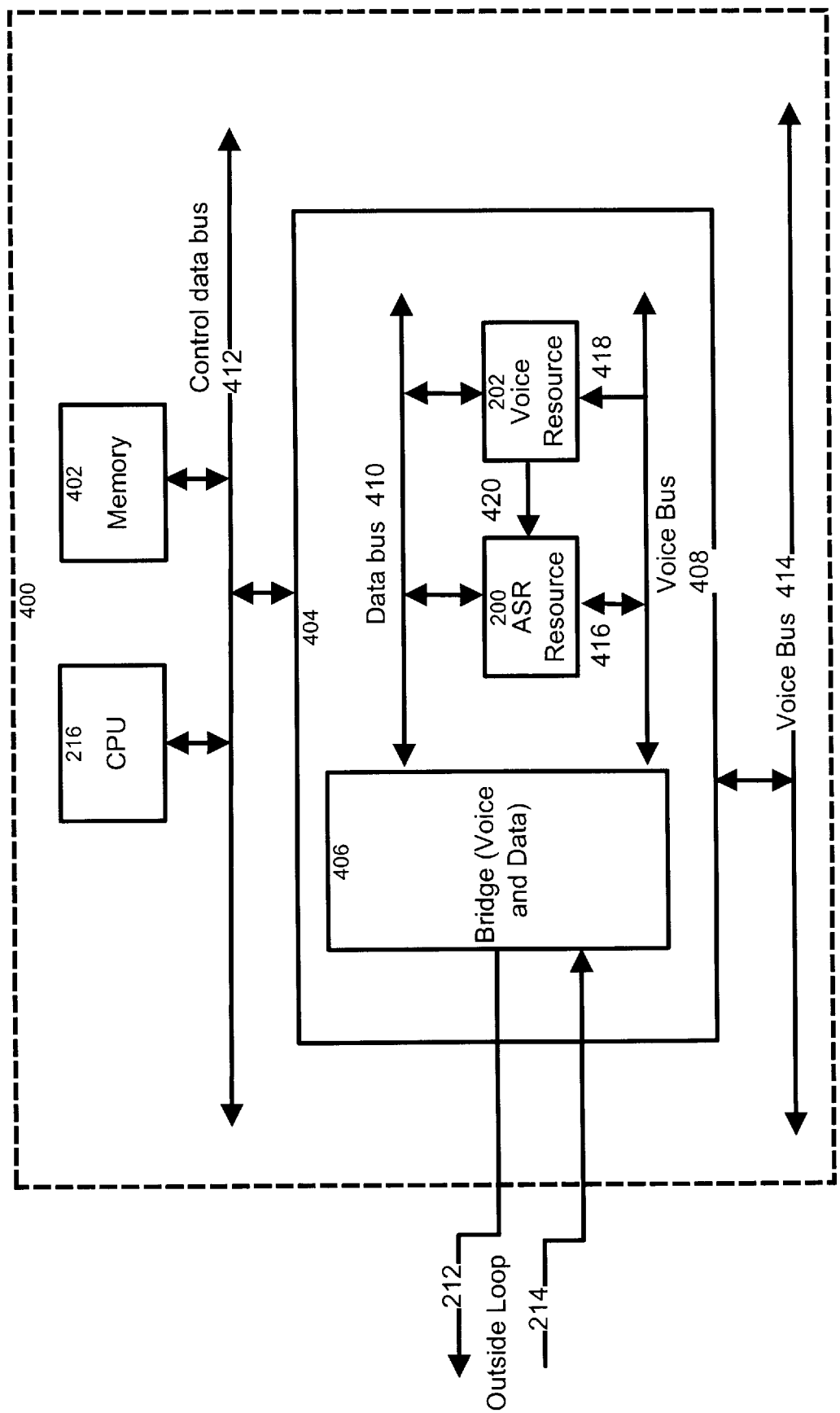
FIG. 4 is a block diagram of a computer telephony system hardware implementation, in accordance with the present invention.

The above-described method for improving the user interface in speech recognition systems can be implemented on any suitable computing platform of the type shown in FIG. 4, typically comprising a Central Processing Unit (CPU) 216, a memory 402 and a data control bus 412. In the illustrated embodiment, the computing platform also includes the ASR resource and the voice resource, running on DSP module 200 and 202 respectively, as well as a voice bus 414. The data control bus 412 interconnects the CPU 216, the memory 402 and both resources, enabling data and control signals to be exchanged between them. The voice bus 414 allows audio data to be transmitted to or from any connected resource. A example of such a voice bus is a Time Division Multiplexed (TDM) voice bus, consisting in a multitude of transmit/receive timeslots which can be routed to or from either of the two resources 200 and 202. The functionality of such a voice bus is well known to those skilled in the art and will not be described in more detail. In a preferred embodiment of the current invention, the computing platform 400 shown in FIG. 4 consists in a single computer, where component 404 is simply one of several computer boards which may be installed on the computer, all interconnected via the voice bus 414. Alternatively, the computing platform 400 may be spread out across several separate but network-connected computers.

In a preferred embodiment of this invention, both the CT system multi-media server and application run on the CPU 216. Alternatively, the application may run from another computer connected to the CT system network. The memory 402 contains a program element that controls the operation of the CT server, implementing the functional blocks depicted in FIG. 2 and described in the specification. That program element is comprised of individual instructions that are executed by the CPU 216, as will be described in detail below.

The illustrated computer board 404 includes a bridge 406, a data bus 410, a voice bus 408 and two Digital Signal Processor (DSP) modules 200 and 202. Alternatively, the computer board 404 may include more or less than two DSP modules. The bridge 406 has a dual functionality, on the one hand connecting the hardware board 404 to the outside loop, formed by the transmit 212 and receive 214 ends, for receiving and transmitting voice data under control of the CPU 216, and on the other hand acting as a gateway for data (for example control signals) between the board components and the rest of the computing platform components. Such a bridge is well known to those skilled in the art, and thus will not be described in more detail. The data bus 410 and the voice bus 408 have the same responsibility as described above for the control data bus 412 and the voice bus 414.

In a preferred embodiment of this invention, both the ASR resource and the voice resource are implemented to run on DSPs located on the same computer board. Alternatively, each resource could be running on DSPs located on different computer boards, both of which would be interconnected via the control data bus 412 and the voice bus 414. Specific to this invention, FIG. 4 shows the direction of audio data flowing to and from the ASR and voice resources during the recognition phase of the CT application. Note that other phases of the CT application may use the buses in a different manner. While the ASR resource DSP module 200 can both receive and send audio data from and to the voice bus 408 over link 416, the voice resource DSP module 202 can only receive audio data from the voice bus 408 over link 418. Any audio data to be sent from the voice resource must pass over link 420 to the ASR resource DSP module 200, which then may or may not forward this audio data over link 416 to the voice bus 408 for transmission to the outside loop, thus forming the daisy chain implementation described above.

Figure 5:
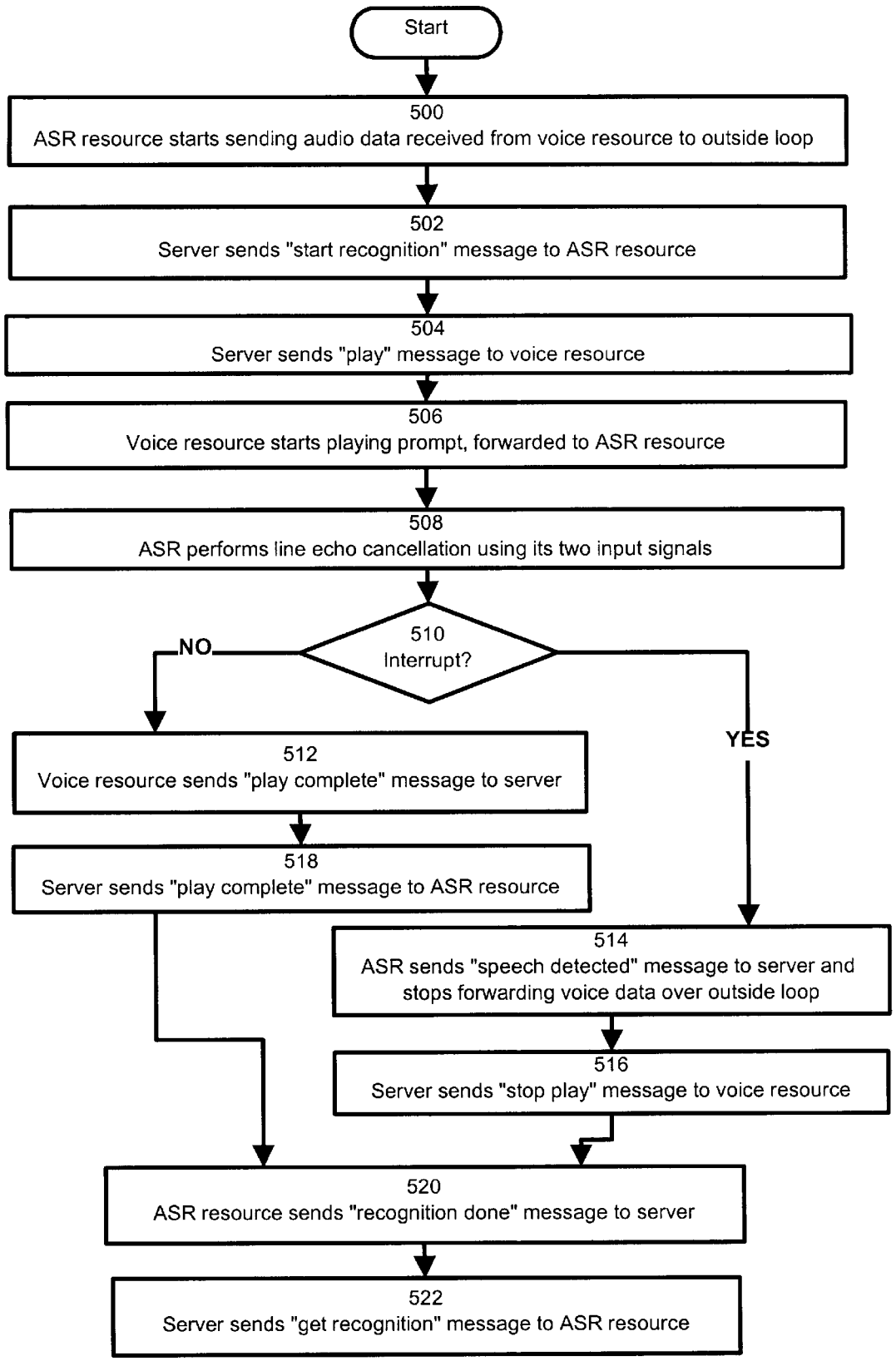
FIG. 5 is a flow chart of a method in accordance with the present invention for implementing the voice path daisy chain within the computer telephony system shown in FIG. 4.

FIG. 5 provides a complete flowchart illustrating an example of the operation of the program element stored in the memory 402. Some of the program element operations are executed on the server side of the CT system by the host CPU 216, while others are executed at the resource side by the DSP modules 200 and 202. This program element regulates the operation of the above described CT system with speech recognition services, in particular the implementation of the voice path daisy chain during a routing recognition attempt. Assume for this example that the voice path 408 is a Time Division Multiplexed (TDM) voice path, and that both DSPs 200 and 202 have access to this voice bus 408 with a number of input and output timeslots. The server running on the CPU 216 has the capabilities to route voice timeslots to and from any resource, and also has control over the outside loop formed by the transmit 212 and receive 214 ends.

At step 500, the ASR resource 200 begins sending the audio data received over link 420 to the voice bus 408 for transmission to the outside loop. This assumes that silence is provided on the voice bus 408 when no audio data is available. At step 502, the server 216 sends the "start recognition" message over the control data bus 412 to the ASR resource 200, which then begins listening for user speech arriving over link 416 from the voice bus 408. The server next sends the "play" request to the voice resource 202 at step 504. Upon receipt of this request, the voice resource 202 commences sending the prompt audio data over link 420 to the ASR resource 200 at step 506. At step 508, the ASR resource forwards the received audio data over link 416 to the voice bus 408 for transmission over the transmit end 212 to the user. The ASR resource simultaneously begins performing line echo cancellation on its two input signals, one being the prompt audio data arriving over link 420, the other being user speech arriving from the voice bus 408 over link 416. This line echo cancellation allows the ASR resource to extract a clean signal from the external line, thus increasing speech recognition accuracy. In the case where the user does not interrupt the system prompt, the voice resource 202 will finish playing its prompt and then send a "play complete" message to the server at step 512. Otherwise, at step 514, when speech is detected in the ASR resource 200, it will stop transmitting audio data over link 420 to the voice resource 202, stop performing echo cancellation and send a "speech detected" message to the server 216. Upon receipt of the "speech detected" message from the ASR resource 200 before the "play complete" message from the voice resource 202, the server will send the "stop play" message to the voice resource 202 at step 516. Otherwise, the server will send a "play complete" message to the ASR resource 200 at step 518. When the user speaks only once the prompt has finished playing, speech recognition occurs normally. At step 520, the ASR resource 200 will send a "recognition done" message to the server 216, indicating that the speech recognition process has been completed. At step 522, the server will send a "get recognition" request to the ASR resource 200, thus completing the process.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

What is claimed is:

1. An automated speech recognition system comprising:
    a voice resource unit for generating a voice prompt signal conveying a voice prompt for delivering information to a user;
    an automated speech recognition unit for performing speech recognition on a vocal response signal derived from a response uttered by the user;
    a server unit for controlling the operation of said voice resource unit and of said automated speech recognition unit;
    a communication channel for transporting the voice prompt signal and the voice response signal, said communication channel having a receiving end and a transmitting end;
    said automated speech recognition unit receiving as inputs said vocal response signal via the receiving end of said communication channel and said voice prompt signal;
    said automated speech recognition unit being operative to pass to said transmitting end said voice prompt signal and to perform echo cancellation on a signal present on said receiving end to generate an echo cancelled signal, said automated speech recognition unit being operative to terminate passage to said transmitting end of said voice prompt signal when the echo cancelled signal is a voice response signal conveying a spoken utterance.

2. An automated speech recognition resource comprising:
    a first input to receive a first signal conveying a voice prompt signal for delivering information to a user;
    a second input to receive a second signal representative of audio data, the second signal being derived from a spoken utterance;
    an output to release the first signal;
    a processing unit operative for:
        a) terminating release of the first signal through said output in response to detection of the second signal at said second input, when the second signal is other than echo of the first signal;
        b) performing speech recognition on the second signal and outputting a data element to convey a result of the speech recognition on the second signal.

3. An automated speech recognition resource as defined in claim 2, wherein said processing unit includes an echo canceler for reducing a magnitude of an echo from the first signal in the second signal.

4. A method for controlling the delivery of a voice prompt by a speech recognition resource, the speech recognition resource comprising:
    a first input to receive a first signal conveying a voice prompt signal for delivering information to a user;
    a second input to receive a second signal representative of audio data, the second signal being derived from a spoken utterance;
    an output to release the first signal;
    the method comprising the steps of:
        a) terminating release of the first signal through said output in response to detection of the second signal at said second input, when the second signal is other than echo of the first signal;
        b) performing speech recognition on the second signal and outputting a data element to convey a result of the speech recognition on the second signal.

5. A method for controlling the delivery of a voice prompt as defined in claim 4, comprising reducing a magnitude of an echo from the first signal occurring in the second signal.

6. An automated speech recognition resource, comprising:
    a first input to receive a first audio signal conveying a voice prompt signal for delivering information to a user;
    a second input to receive a second audio signal representative of data derived from a spoken utterance uttered by the user in response to information delivered to the user by a voice prompt signal;
    an output to release the first audio signal for delivery to the user;
    a processing unit operative for:
        a) terminating release of the first audio signal through said output in response to detection of a signal at said second input;
        b) performing speech recognition on the signal at said second input and outputting a data element to convey a result of the speech recognition on the signal at said second input.

7. An automated speech recognition system comprising:

voice resource means for generating a voice prompt signal conveying a voice prompt for delivering information to a user;

automated speech recognition means for performing speech recognition on a vocal response signal derived from a response uttered by the user;

server means for controlling the operation of said voice resource means and of said automated speech recognition means;

communication means for transporting the voice prompt signal and the voice response signal, said communication means having a receiving end and a transmitting end;

said automated speech recognition means receiving as inputs said vocal response signal via the receiving end of said communication means and said voice prompt signal;

said automated speech recognition means being operative to pass to said transmitting end said voice prompt signal and to perform echo cancellation on a signal present on said receiving end to generate an echo cancelled signal, said automated speech recognition means being operative to terminate passage to said transmitting end of said voice prompt signal when the echo cancelled signal is a voice response signal conveying a spoken utterance.

8. An automated speech recognition resource, comprising:

first input to receive a first signal conveying a voice prompt signal for delivering information to a user;

second input means to receive a second signal representative of audio data, the second signal being derived from a spoken utterance;

output means to release the first signal;

processing means operative for:
   a) terminating release of the first signal through said output means in response to detection of the second signal at said second input means, when the second signal is other than echo of the first signal;
   b) performing speech recognition on the second signal and outputting a data element to convey a result of the speech recognition on the second signal.

* * * * *